US010597249B2

(12) United States Patent
Swartz et al.

(10) Patent No.: US 10,597,249 B2
(45) Date of Patent: Mar. 24, 2020

(54) METHOD AND APPARATUS FOR STACKER MODULE FOR AUTOMATED COMPOSITE-BASED ADDITIVE MANUFACTURING MACHINE

(71) Applicant: Impossible Objects, Inc., Northbrook, IL (US)

(72) Inventors: Robert Swartz, Highland Park, IL (US); Eugene Gore, Des Plaines, IL (US); Len Wanger, Chicago, IL (US); Chris Wagner, Northbrook, IL (US); Brian Conti, Chicago, IL (US)

(73) Assignee: Impossible Objects, Inc., Northbrook, IL (US)

( * ) Notice: Subject to any disclaimer, the term of this patent is extended or adjusted under 35 U.S.C. 154(b) by 0 days.

(21) Appl. No.: 15/922,469

(22) Filed: Mar. 15, 2018

(65) Prior Publication Data

US 2019/0134890 A1    May 9, 2019

Related U.S. Application Data

(60) Provisional application No. 62/473,062, filed on Mar. 17, 2017.

(51) Int. Cl.
*B65H 31/26* (2006.01)
*B29C 64/147* (2017.01)
(Continued)

(52) U.S. Cl.
CPC ........... *B65H 31/26* (2013.01); *B29C 64/147* (2017.08); *B29C 64/153* (2017.08);
(Continued)

(58) Field of Classification Search
CPC ... B29C 64/147; B29C 64/205; B29C 64/245; B29C 64/321; B29C 64/329;
(Continued)

(56) References Cited

U.S. PATENT DOCUMENTS

| 3,431,166 A | 3/1969 | Mizutani |
| 4,312,268 A | 1/1982 | King et al. |

(Continued)

FOREIGN PATENT DOCUMENTS

| CN | 101181776 A | 5/2008 |
| CN | 201329424 Y | 10/2009 |

(Continued)

OTHER PUBLICATIONS

International Search Report for PCT/US12/52946 ("Methods and Apparatus for 3D Fabrication"), dated Jan. 10, 2013.

(Continued)

*Primary Examiner* — Jeremy R Severson
(74) *Attorney, Agent, or Firm* — Robert P. Greenspoon; Flachsbart & Greenspoon LLC

(57) ABSTRACT

A stacker component of an apparatus for automated manufacturing of three-dimensional composite-based objects for aligning registration of sheets. The stacker includes a sheet catcher; a frame having a base plate with the base plate having tapered registration pins to align a stack of substrate sheets. The registration pins are mounted in the base plate and project vertically to a location just below the sheet catcher. The stacker also has a presser with a press plate and a belt driver system that moves the press plate up and down allowing the press plate to exert downward pressure on the stack and a slide system with two guide rails that enable the base plate to be loaded and unloaded. A conveyor can be disposed so that after a substrate sheet exits a powder or printing system, the sheet is conveyed onto the sheet catcher.

10 Claims, 17 Drawing Sheets

US 10,597,249 B2
Page 2

(51) Int. Cl.
*B29C 64/153* (2017.01)
*B29C 64/393* (2017.01)
*B29C 64/307* (2017.01)
*B33Y 50/02* (2015.01)
*B33Y 10/00* (2015.01)
*B33Y 30/00* (2015.01)
*B33Y 40/00* (2020.01)

(52) U.S. Cl.
CPC .......... *B29C 64/307* (2017.08); *B29C 64/393* (2017.08); *B33Y 10/00* (2014.12); *B33Y 30/00* (2014.12); *B33Y 40/00* (2014.12); *B33Y 50/02* (2014.12); *B65H 2301/4223* (2013.01); *B65H 2405/60* (2013.01)

(58) Field of Classification Search
CPC . B65H 31/26; B65H 3/22; B65H 3/58; B65H 2301/4223; B65H 2405/60; B65H 2701/1212; B65H 2301/4355; B65H 31/34; B32B 2250/20; B32B 2260/021
USPC ........................................................ 271/168
See application file for complete search history.

(56) References Cited

U.S. PATENT DOCUMENTS

| | | |
|---|---|---|
| 4,393,389 A | 7/1983 | Rasekhi et al. |
| 4,453,694 A | 6/1984 | Andreasson |
| 4,863,538 A | 9/1989 | Deckard |
| 5,176,949 A | 1/1993 | Allagnat et al. |
| 5,204,055 A | 4/1993 | Sachs et al. |
| 5,260,009 A | 11/1993 | Penn |
| 5,340,656 A | 8/1994 | Sachs et al. |
| 5,364,657 A | 11/1994 | Throne |
| 5,369,192 A | 11/1994 | Ko et al. |
| 5,514,232 A | 5/1996 | Burns |
| 5,637,175 A | 6/1997 | Feygin et al. |
| 5,876,550 A | 3/1999 | Feygin et al. |
| 5,988,959 A | 11/1999 | Sugata |
| 6,147,138 A | 11/2000 | Hochsmann et al. |
| 6,161,995 A | 12/2000 | Wakazono et al. |
| 6,471,800 B2 | 10/2002 | Jang et al. |
| 6,551,038 B1 | 4/2003 | Sugata et al. |
| 6,596,224 B1 | 7/2003 | Sachs et al. |
| 6,632,054 B2 | 10/2003 | Geiger et al. |
| 6,740,185 B2 | 5/2004 | Baldwin |
| 6,780,368 B2 | 8/2004 | Liu et al. |
| 8,202,464 B2 * | 6/2012 | Boot .................... B29C 64/135 264/308 |
| 8,377,547 B2 | 2/2013 | Noguchi et al. |
| 2002/0104935 A1 | 8/2002 | Schweizer |
| 2004/0070582 A1 | 4/2004 | Smith et al. |
| 2004/0112523 A1 | 6/2004 | Crom et al. |
| 2005/0059757 A1 | 3/2005 | Bredt et al. |
| 2006/0061618 A1 | 3/2006 | Hernandez et al. |
| 2007/0241482 A1 | 10/2007 | Giller et al. |
| 2008/0006958 A1 | 1/2008 | Davidson |
| 2008/0260954 A1 | 10/2008 | Paton et al. |
| 2009/0255428 A1 | 10/2009 | Stiel |
| 2009/0321979 A1 | 12/2009 | Hiraide |
| 2010/0302326 A1 | 12/2010 | Morohoshi et al. |
| 2011/0045724 A1 | 2/2011 | Bahukudumbi |
| 2011/0101564 A1 | 5/2011 | Keenihan et al. |
| 2011/0121491 A1 | 5/2011 | Costabeber |
| 2012/0059503 A1 | 3/2012 | Pax et al. |
| 2013/0171431 A1 | 7/2013 | Swartz et al. |
| 2014/0238173 A1 | 8/2014 | Swartz et al. |
| 2014/0257549 A1 | 9/2014 | Swartz et al. |
| 2015/0137423 A1 | 5/2015 | Ding |
| 2015/0158246 A1 | 6/2015 | Swartz et al. |
| 2015/0231825 A1 | 8/2015 | Swartz et al. |
| 2016/0082657 A1 | 3/2016 | Swartz et al. |
| 2016/0082658 A1 | 3/2016 | Swartz et al. |
| 2016/0082695 A1 * | 3/2016 | Swartz .................... B29C 70/42 428/172 |
| 2016/0339645 A1 | 11/2016 | Swartz et al. |

FOREIGN PATENT DOCUMENTS

| | | |
|---|---|---|
| CN | 104150915 A | 11/2014 |
| EP | 2776233 A2 | 9/2014 |
| EP | 2961585 A2 | 1/2016 |
| JP | H11236541 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |

OTHER PUBLICATIONS

J. Eltgen, A Short Review of Magnetography and Its Related Materials Problems, Ind. Eng. Chem. Prod. Res. Dev., vol. 24, No. 2, 1985, pp. 196-201.

Extended European Search Report, from EP Application No. 12828967 (EP20120828967) ("Methods and Apparatus for 3D Fabrication"), dated Jun. 9, 2015.

International Search Report for International Applicaton No. PCT/US14/18806 ("Methods and Apparatus for Three-Dimensional Printed Composites"), dated Aug. 5, 2014.

Invitation to Pay Additional Fees for International Applicaton No. PCT/US14/18806 ("Methods and Apparatus for Three-Dimensional Printed Composites"), dated May 6, 2014.

Decision on Protest for International Applicaton No. PCT/US14/18806 ("Methods and Apparatus for Three-Dimensional Printed Composites"), dated Jun. 19, 2014.

Restriction Requirement in U.S. Appl. No. 13/582,939 ("Methods and Apparatus for 3D Fabrication"), dated Sep. 30, 2015.

Non-Final Rejection in U.S. Appl. No. 13/582,939 ("Methods and Apparatus for 3D Fabrication"), dated Mar. 29, 2016.

Final Rejection in U.S. Appl. No. 13/582,939 ("Methods and Apparatus for 3D Fabrication"), dated Oct. 7, 2016.

Non-Final Rejection in U.S. Appl. No. 14/835,690 ("Apparatus for Fabricating Three-Dimensional Printed Composites"), dated Nov. 15, 2016.

Non-Final Rejection in U.S. Appl. No. 14/566,661 ("Tow Stabilization Method and Apparatus"), dated Mar. 21, 2017.

Applicant Initiated Interview Summary in U.S. Appl. No. 14/703,372 (". . . Flattened Substrate Sheets"), dated Feb. 9, 2017.

Invitation to Pay Additional Fees for International Application No. PCT/US17/17672 ("Method/Apparatus Automated Composite-Based Additive Manufacturing"), dated Apr. 17, 2017.

Non-Final Rejection in U.S. Appl. No. 13/582,939 ("Methods and Apparatus for 3D Fabrication"), dated Apr. 27, 2017.

Decision on Protest for PCT/US17/17672 ("Method and Apparatus for Automated Composite-Based Additive Manufacturing"), mailed May 26, 2017.

Final Rejection in U.S. Appl. No. 14/190,912 ("Methods and Apparatus for Construction of Machine Tools"), dated Jun. 13, 2017.

Non-Final Rejection in U.S. Appl. No. 14/199,603 ("Methods and Apparatus for Photosculpture"), dated Apr. 12, 2016.

Restriction Requirement in U.S. Appl. No. 14/566,661 ("Tow Stabilization Method and Apparatus"), dated Dec. 9, 2016.

Restriction Requirement in U.S. Appl. No. 14/703,372 ("Methods and Apparatus for Three Dimensional Printed Composites Based on Flattened Substrate Sheets"), dated Jul. 25, 2016.

Non-Final Rejection in U.S. Appl. No. 14/703,372 ("Methods and Apparatus for Three Dimensional Printed Composites Based on Flattened Substrate Sheets"), dated Dec. 22, 2016.

International Search Report and Written Opinion in International Application No. PCT/US16/62319 ("Additive Manufacturing Method and Apparatus"), dated Jan. 23, 2017.

International Search Report and Written Opinion in International Application No. PCT/US16/62356 (". . . Metal Matrix Composites . . . "), dated Jan. 23, 2017.

(56) References Cited

OTHER PUBLICATIONS

Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.

* cited by examiner

METHOD AND APPARATUS FOR STACKER MODULE FOR AUTOMATED COMPOSITE-BASED ADDITIVE MANUFACTURING MACHINE

This application claims the benefit of U.S. Provisional Application No. 62/473,062, filed Mar. 17, 2017. Application 62/473,062 is hereby incorporated by reference in its entirety.

TECHNICAL FIELD OF THE INVENTION

The present invention relates to additive manufacturing and, in particular to an apparatus that is a stacker component of an apparatus for automated manufacturing of three-dimensional composite-based objects.

BACKGROUND OF THE INVENTION

Additive manufacturing, such as three-dimensional printing, can be seen as largely a materials problem. One of the limitations of current methods is a limited materials palette and slow build speeds.

These and other limitations of the prior art are avoided by a methodology known as Composite-Based Additive Manufacturing (CBAM). CBAM is described in full in co-pending U.S. patent application Ser. No. 13/582,939, filed Nov. 2, 2012, Ser. No. 14/835,690, filed Aug. 25, 2015, and Ser. No. 14/835,635, filed Aug. 25, 2015, each of which is incorporated fully herein by reference.

International application no. PCT/US17/17672, filed Feb. 13, 2017, describes a particular method and apparatus for automating Composite-Based Additive Manufacturing (CBAM). International application no. PCT/US17/1772 is incorporated fully herein by reference.

A problem arises during the automated design and manufacture of a 3D object, using the CBAM method, which is how to get sheets automatically stacked on top of each other while holding precise sheet-to-sheet registration.

Use of registration pins as a way of registering things together is a method that is widely used. For example in metal stamping registration pins can be used in stages to assure that multiple steps will be done in register. A similar process is used in making negatives for four color process printing.

SUMMARY OF THE INVENTION

This application describes a particular stacker method and apparatus which is a component of an overall machine for automating Composite-Based Additive Manufacturing (CBAM). The stacker may be an end component of the machine, enabling the stacking of sheets on top of each other with a high degree of sheet-to-sheet registration. With the design of the present invention, the overall precision of the machine can be relaxed except for a few key components.

As substrate sheets go through the CBAM machine, respective layers of a 3D object ("layer images") are printed on respective substrate sheets. To form the 3D object from the layers, each substrate sheet needs to be appropriately aligned with the sheet above and below it so that the respective layer images printed on those sheets are aligned in register. The stacker helps to do this by causing the substrate sheets to stack on top of each other in register. This is accomplished by providing registration holes on each sheet in a predefined relationship to the position of the layer images printed on the sheet, so that each layer image properly aligns with the one above and below it when the sheet is positioned on the registration pins that run through the stacker. If the registration holes are not properly oriented in relationship to the position of the layer image on the substrate sheet, then the part formed from the layers will have poor tolerances or the part may even fail to form.

The relationship between the registration holes and the image oriented on the sheet is critical for precise sheet to sheet registration. Thus if the relationship between the registration holes and the image are precisely fixed, it is possible to achieve precise registration between the sheets. If the sheet is punched with an apparatus that is fixed in its relationship to the printer, this relationship can be repeatable and precise. Using this approach one can build a device where precision is largely limited to this relationship.

One approach to this problem is to have the sheets stack on tapered pins. The end of the pin can have a diameter of ⅛", while the hole in the sheet can have a diameter of ¼". Thus if the there is some mis-registration of the punch and the corner of the sheet, the sheet will still fall on the pin.

Thus, registration does not need to be exact when the sheet is fed by the material feeder, and placement of the substrate sheet on the printer platen does not need to be exact when the sheet is printed and punched. Instead, accurate sheet-to-sheet registration results from there being very good registration between the location where the sheet is punched and the location where it is printed upon. For example, precision between punching and printing locations may be a few thousandths of an inch, while precision of placing the sheet onto the printer platen could be as much as an eighth or quarter of an inch. The metal frame of the stacker ensures that registration achieved upon printing and punching is preserved within a few thousandths of an inch.

DETAILED DESCRIPTION OF INVENTION

Overall Machine

Figure 1:
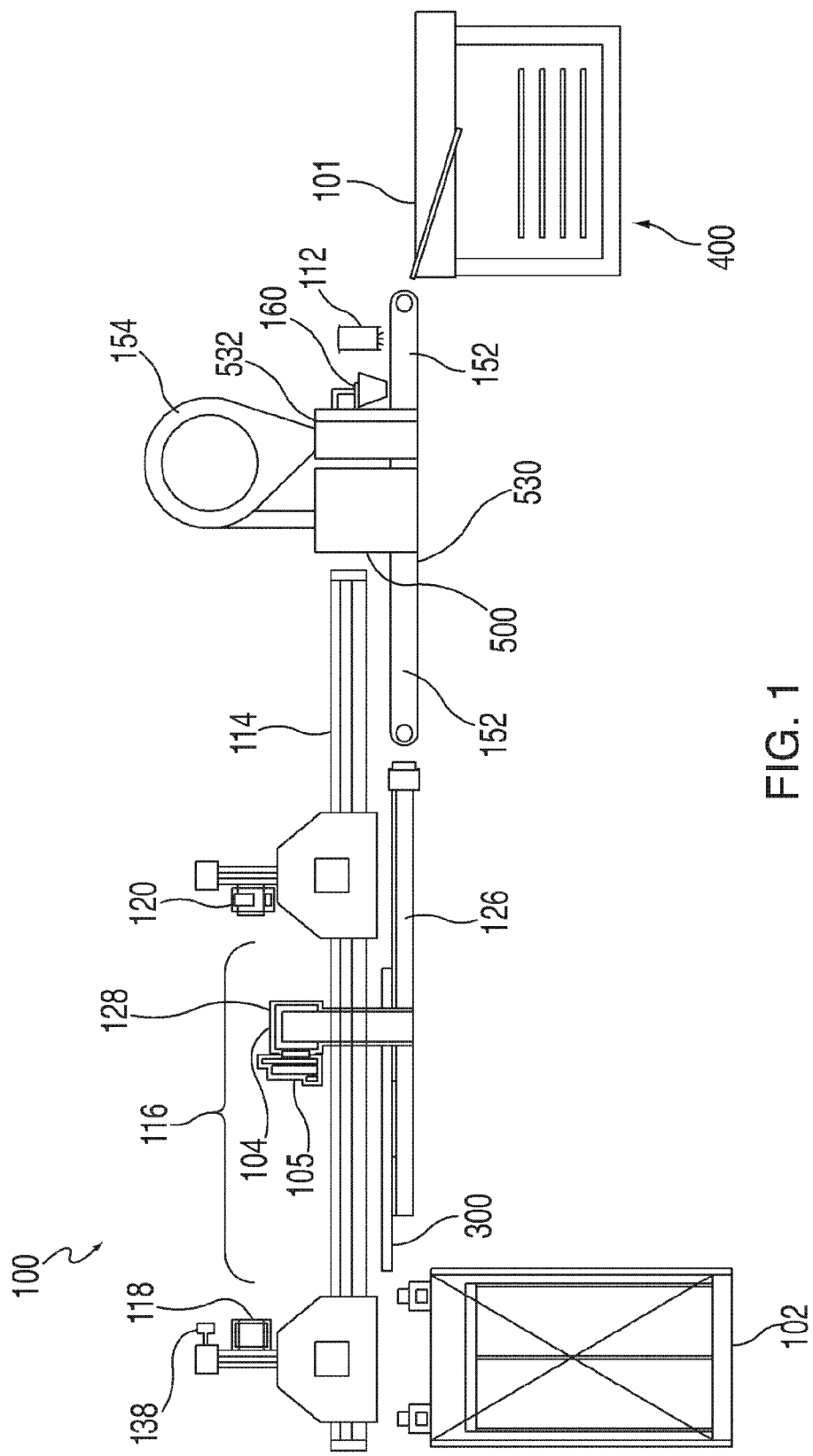
FIG. 1 is a schematic of an example embodiment of an apparatus for composite-based additive manufacturing.

The CBAM process described in the incorporated prior applications (U.S. patent application Ser. Nos. 13/582,939, 14/835,690, and 14/835,635) is automated by performing the steps through a number of components or subsystems that operate in a coordinated manner. A machine that automates the steps is described in international application no. PCT/US17/17672 and U.S. application Ser. No. 15/611,320. The main components of an example embodiment of the machine 100 are shown in FIG. 1, and include a material feeder 102, a printer 104, a powder system 500 comprising a powder applicator 530 and powder remover/recycler 532, an optional fuser 112, a transfer system, and other elements that serve to connect and control the various components. While example components are shown in FIG. 1, various alternative and optional components are also suitable for use with the machine 100.

The material feeder 102 holds a stack of substrate sheets 101, such as carbon fiber sheets, and moves them into proper position so that a single sheet 101 at a time can be transferred to the printer platen 300 and printer 104. Sheets 101 are transferred to, and positioned for, the printer 104 by means of the transfer system. The printer 104 then deposits fluid onto a substrate sheet 101 as described in the incorporated prior applications (U.S. patent application Ser. Nos. 13/582,939, 14/835,690, and 14/835,635), and includes a punching mechanism for placing registration holes in the sheet 101 at desired locations. The registration holes are placed in precise, pre-defined positions relative to the position of the layer images printed onto the sheets. This can be accomplished by mounting the punches on the same frame on which the printing mechanism is placed. The powder applicator 530 then deposits thermoplastic powder onto the substrate sheet 101, whereupon the powder adheres to the areas of the sheet 101 that have been made wet by the printer 104, i.e., the layer images. The powder remover/recycler 532 removes any powder that did not adhere to the sheet 101. The fuser 112, which is optional, heats the powder on the substrate sheet 101 in a manner sufficient to cause the powder to melt and thereby affix to the sheet 101, so that the powder remains on the sheet 101 when and if the underlying fluid from the printer 104 dries. The apparatus also includes a stacker subsystem 400 for stacking the sheets in register. This cycle is repeated for as many additional substrate sheets 101 as required for making a specified three-dimensional (3D) part, with each sheet 101 normally representing a layer of the 3D part.

Also shown in the embodiment of the machine depicted in FIG. 1 is a distance sensor 138, Coanda or felted-material gripper 118, XYZ positioner 116, X positioner 126, Y positioner 128, print heads 105, needle or felted-material gripper 120, rails 114, conveyor 152, cyclone 154, and air knife 160. These components are described in detail in international application no. PCT/US17/1772 and U.S. application Ser. No. 15/611,320.

Figure 2:
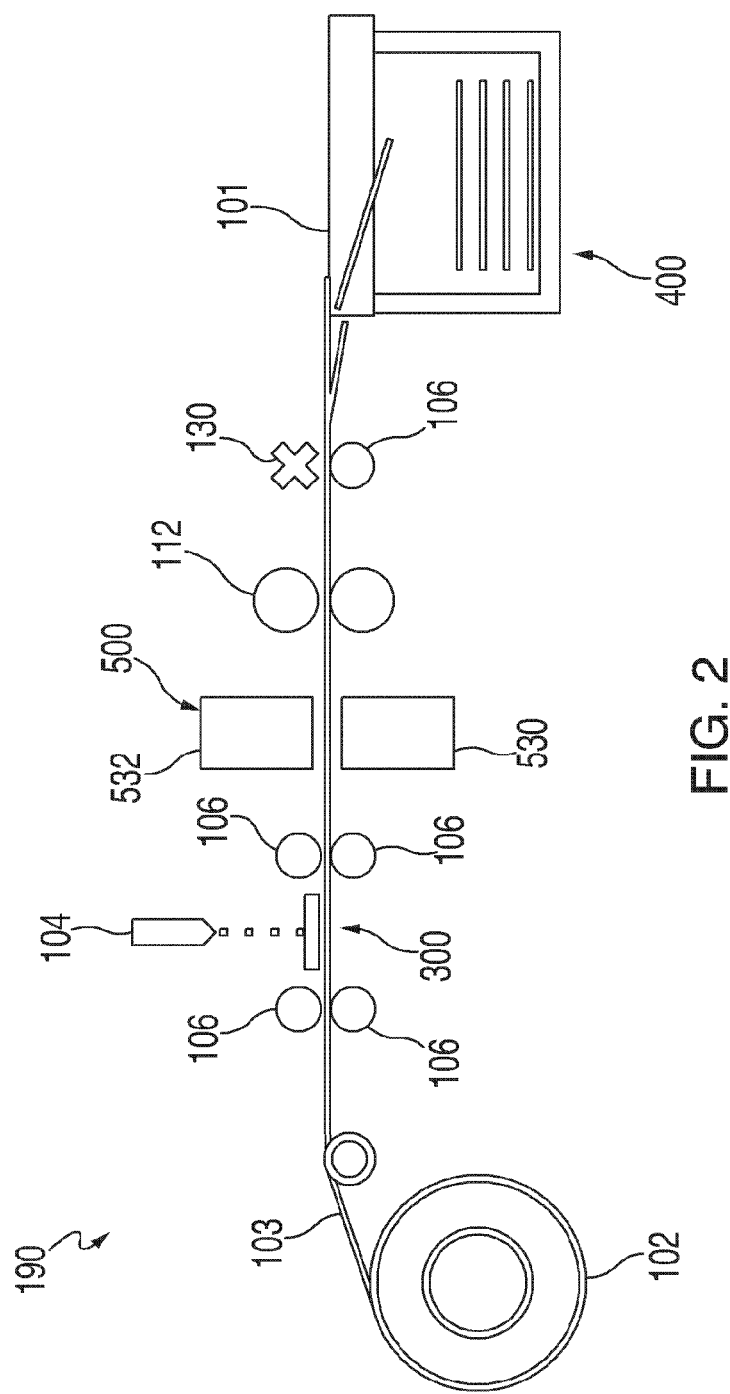
FIG. 2 depicts a roll-based continuous feed apparatus for composite-based additive manufacturing.
Figure 3:
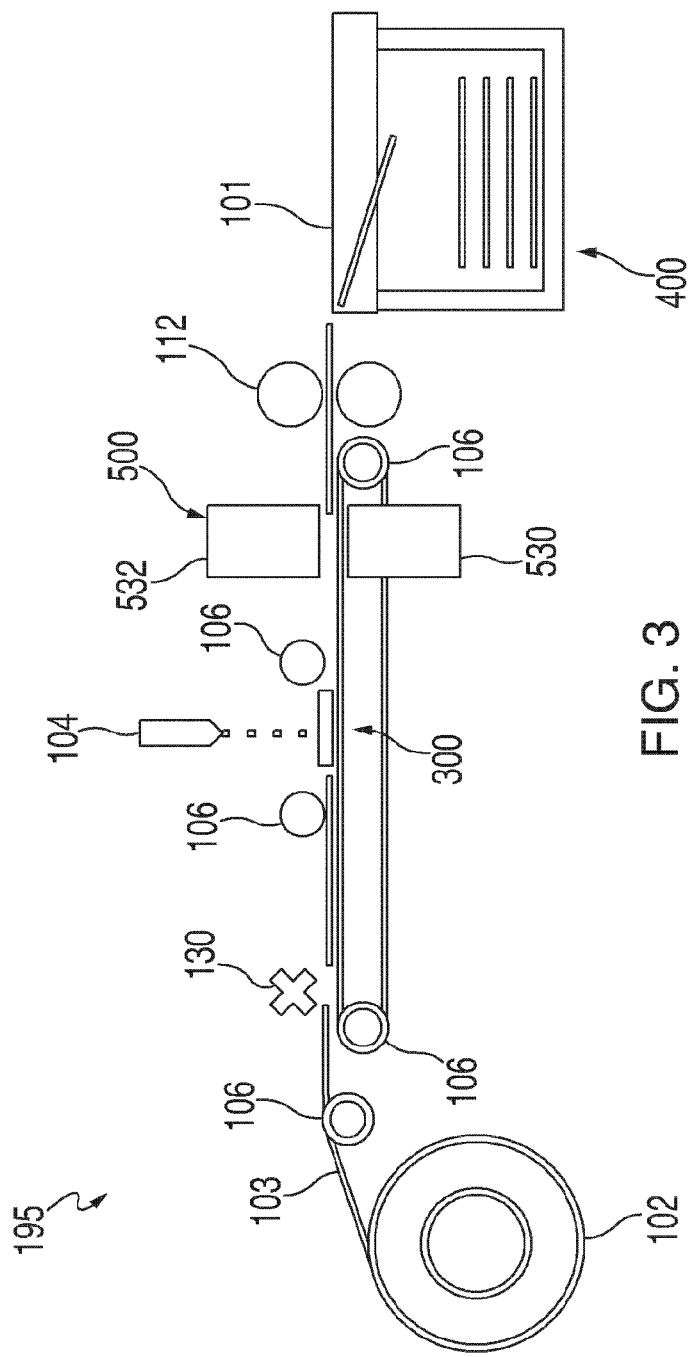
FIG. 3 depicts a roll-based roll to sheet apparatus for composite-based additive manufacturing.

Instead of using substrate sheets, a roll of substrate material may be used in the CBAM process and automated machine. FIG. 2 depicts a continuous feed roll implementation 190, and FIG. 3 depicts a roll to sheet implementation 195. In these embodiments, a roll of substrate material 102 is mounted and situated ahead of the printer 104. A tensioning system 103 together with feed rollers 106 are used to hold and advance the web defined by the length of the roll material fed through the system. The web 102 can extend through all of the components of the system—printer 104, recycler 500 comprising powder applicator 530 and powder remover/recycler 532, and, if present, fuser 112—and then be cut by a cutter 130 into single sheets 101 prior to stacking by the stacker subsystem 400. This is depicted in FIG. 2. Alternatively, as depicted in FIG. 3 the web 102 may be cut by the cutter 130 into single sheets 101 at any prior point in the process. For example, the web 102 may be converted to a single sheet 101 prior to advancing the resulting sheet 101 onto the printer platen 300. The web 102 may be converted to a single sheet after the leading edge is situated on the platen 300. The web 102 may be converted to a single sheet after the printing operation is completed and before the resulting sheet is fed into the powder applicator 530, and so on.

Motivation for Having a Stacker Subsystem

The CBAM process prints each layer of a 3D object on a respective substrate sheet. During the printing operation, the CBAM process also punches registration holes in the substrate sheets 101. The holes are punched in registration to where the object layers are printed on the sheet, so that when the sheets are stacked on pins 414 in register on top of each other, the printed object layers are also in register. These layers are then fused together, and the excess material is removed producing a 3D object in the shape of the original 3D model. In order for the 3D object produced to accurately reproduce the model, the registration of the location of the holes are punched in the substrate sheets in relation to the location where the object layers are printed on the sheet must be accurate. Any inaccuracy in the registration between the holes and the printed areas will cause inaccuracy in the sheet-to-sheet registration and will be reflected in the 3D object that is produced. In particular, vertical edges and surface finish are very sensitive to mis-registration of sheets, as are feature definition and dimensional tolerances.

Because the present invention uses registration pins 414 to align the printed sheets, the locations of where the layer of the object is printed on the sheet must be accurately correlated with the pins 414. That is, the relationship of the printed layer to the registration pins 414 must remain the same for each sheet that is printed. This is a more stringent requirement than typical printing, because in typical printing there is no requirement for sheet-to-sheet registration. Hence, this is not something that is typically done in conventional printing. In the present invention, registration holes are punched with the same mechanism that performs the printing so that the relationship between the holes and the printed image remains the same. This can also be done by other methods so long as this relationship remains unchanged for each sheet printed. It is important to note that using this methodology for precision allows other parts of the machine system to be less precise. This has a number of advantages, including making the other parts easier to design, less expensive to make, and the overall machine easier to manufacture and calibrate.

In the present invention, the substrate sheet 101 is typically picked up by a gripper 118 or other method as previously described, then placed on a platen 300. The level of registration that is required for placing the sheet 101 on the platen 300 is around ⅛ to ¼ inch. Once the substrate sheet 101 is on the platen 300, it is printed on, and registration holes are punched with (a) the printing being done in precise relationship to the location on the sheet where the holes are punched, and (b) the alignment between the punch or punches being precise and repeatable between sheets 101. Alternatively, this punching can be done at other points in the process as long as precision between registration hole locations and printing locations are maintained.

After printing and punching, the sheet 101 is typically picked up by a needle gripper or felted-material gripper 120 and placed on a conveyor 152. It is then powdered and vacuumed so that powder remains on the sheet 101 where the image was printed. This makes up one layer of the 3D object. Again, this step requires no precise registration. After this, the sheet 101 is transferred to another conveyor 152 (or it could remain on the same conveyor) where it is aligned by channels 153 on either side of the conveyor 152 (note FIGS. 13-17). The channels 153 align the sheet 101 if it is not rectilinear with respect to the conveyor 152. Then with both air and the momentum of the sheet 101 from the conveyor 152, the sheet 101 goes into a stacker 400. In the stacker 400 there are right angle lengths of sheet metal that act as corners and align the back corner of the sheet 101. The sheet is held up by spring steel 418 and then pressed over registration pins 414 onto the stack.

The punched holes in the sheet 101 are slightly larger than the diameter of the main body of the registration pins 414. The difference in diameter between the punched holes and the registration pins 414 should be enough so that the sheets can be stacked tightly onto the pins 414 without puckering, tearing or otherwise deforming. The registration pins 414 can be tapered 416 at their top ends as shown in FIGS. 7-10. The ends of the pins can be around ⅛ inch in diameter whereas the punched holes can be larger, such as ¼ inch. This allows there to be some inaccuracy in the initial placement of sheet 101 on the stacker as it relates to the pins 414 and still allows the sheet 101 to be placed onto the pins 414 (at the tapered ends 416) but then achieve precise registration as the sheet travels down onto the main body of the pins 414. The difference between the top of the tapered pin 416 and the bottom can vary based on various criteria, among them the desired precision of the system.

Figure 11:
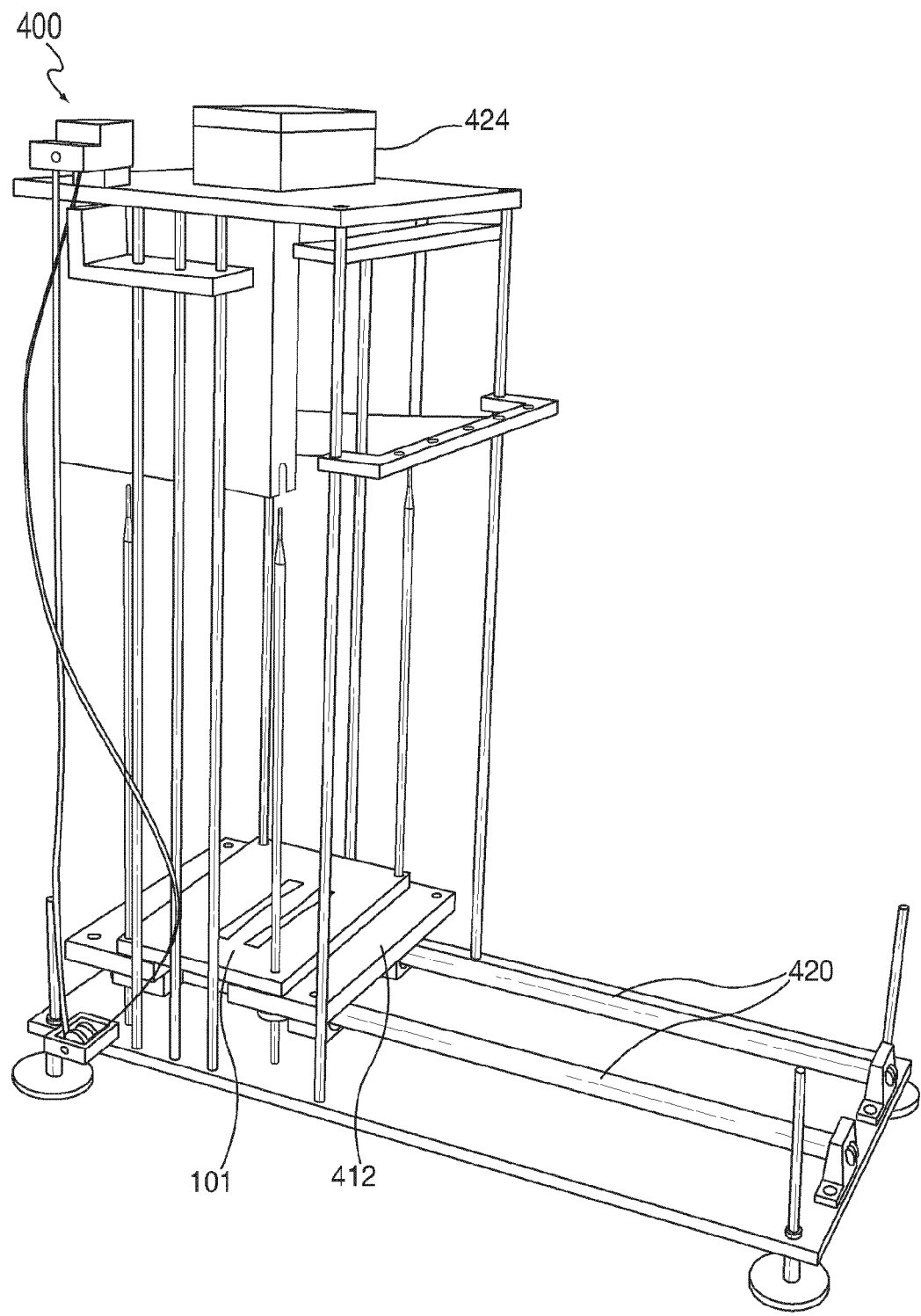
FIG. 11 is a view of the stacker with its base plate loaded.
Figure 12:
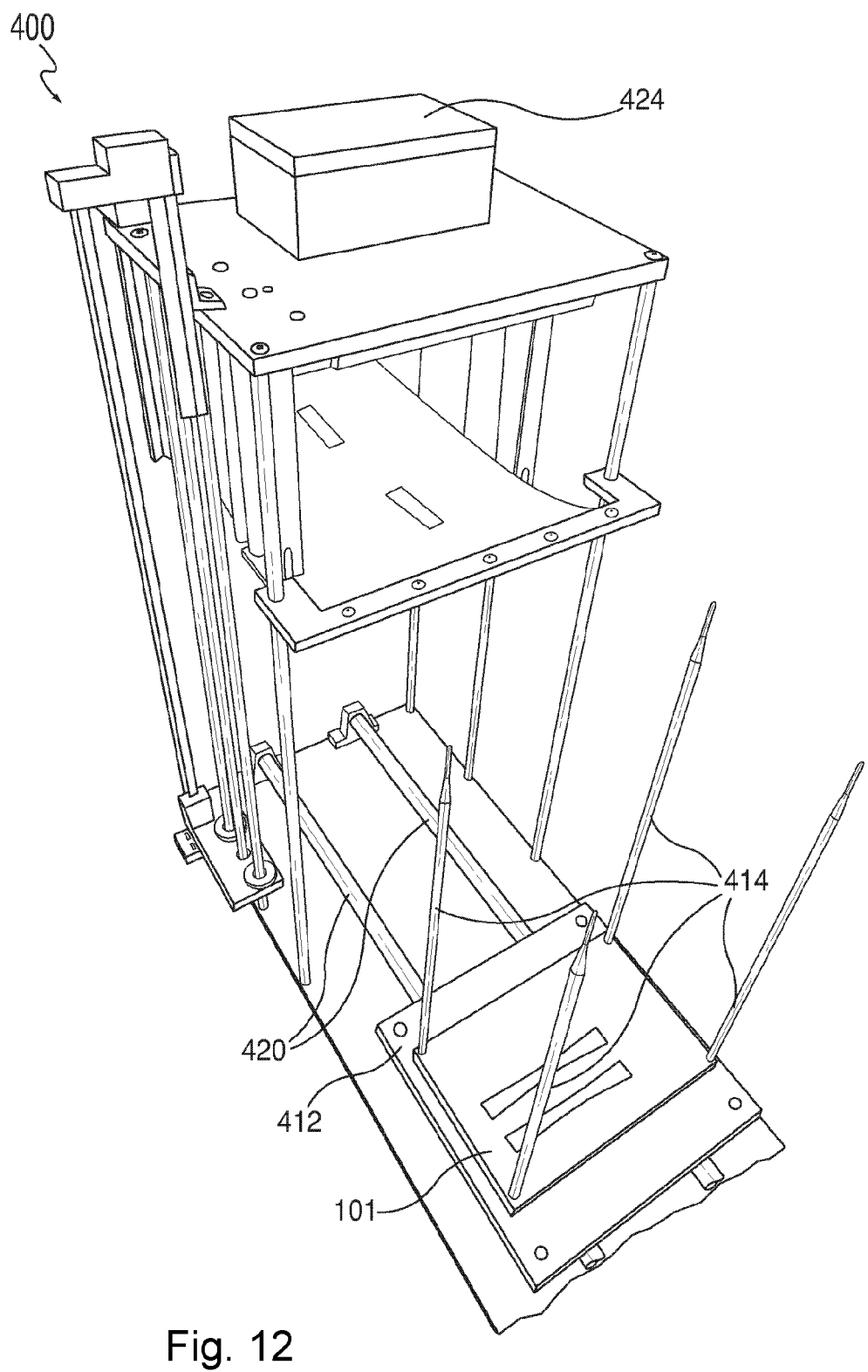
FIG. 12 is another view of the stacker with its base plate unloaded.
Figure 13:
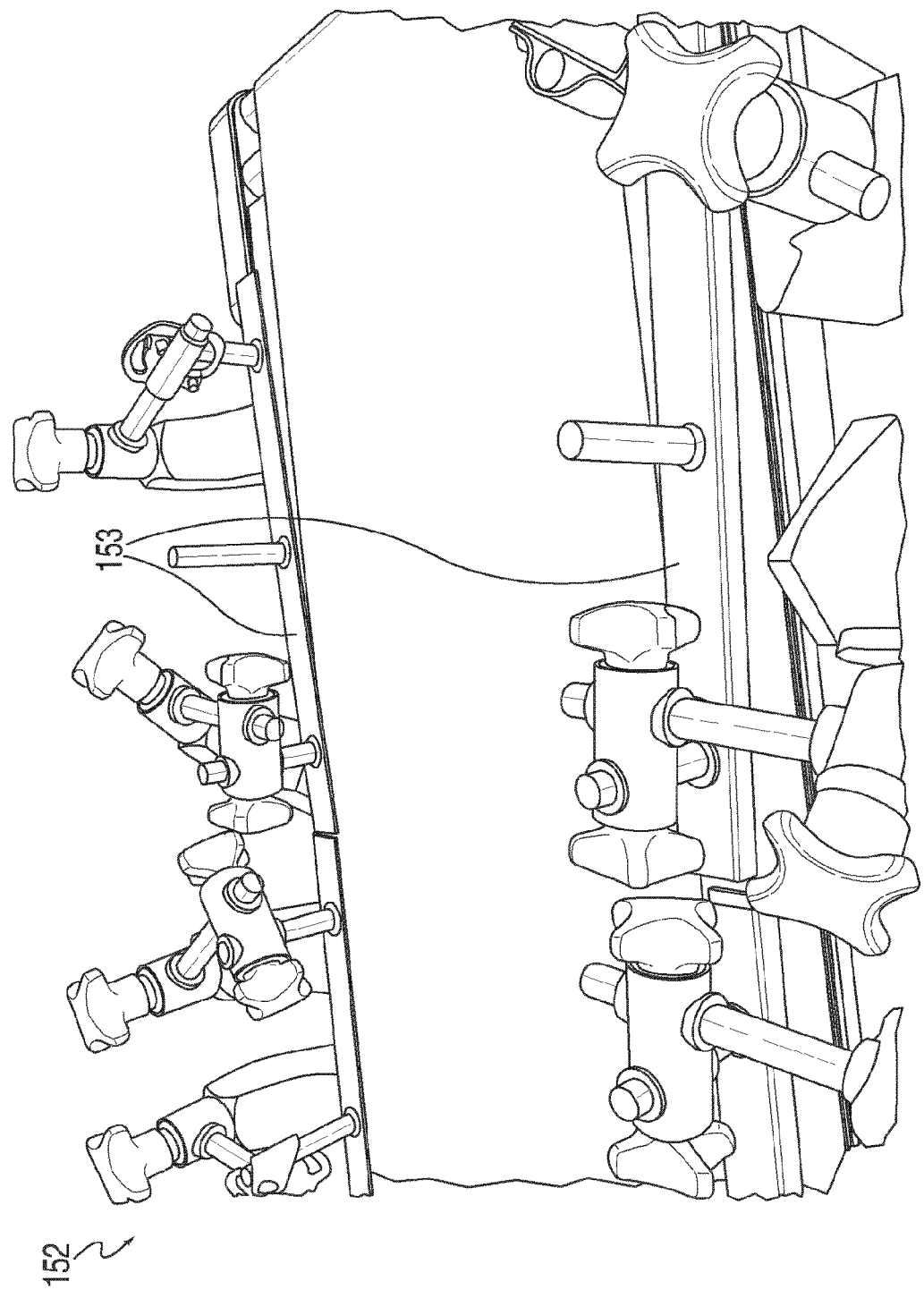
FIG. 13 is a view of a conveyor.
Figure 14:
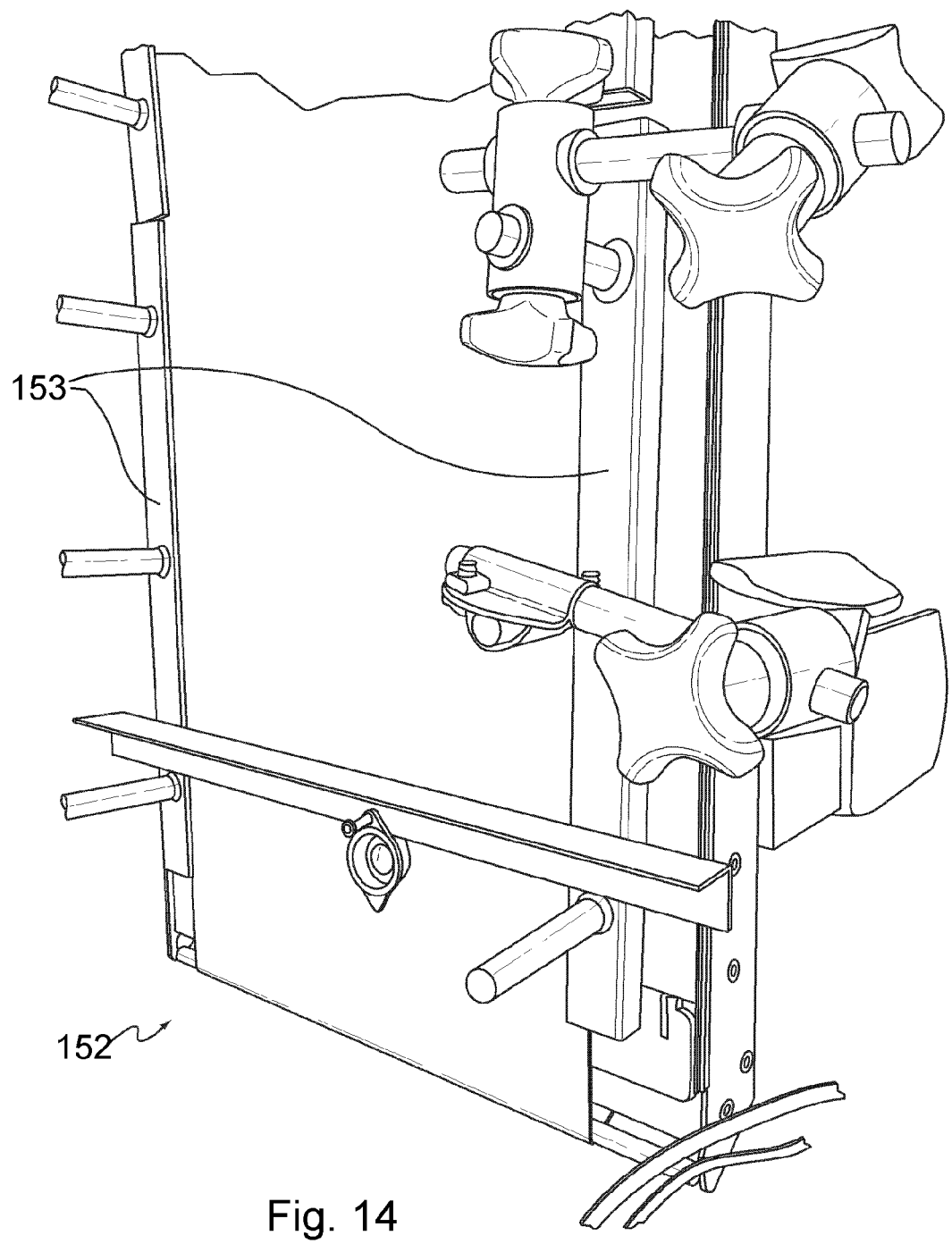
FIG. 14 is another view of the conveyor.
Figure 15:
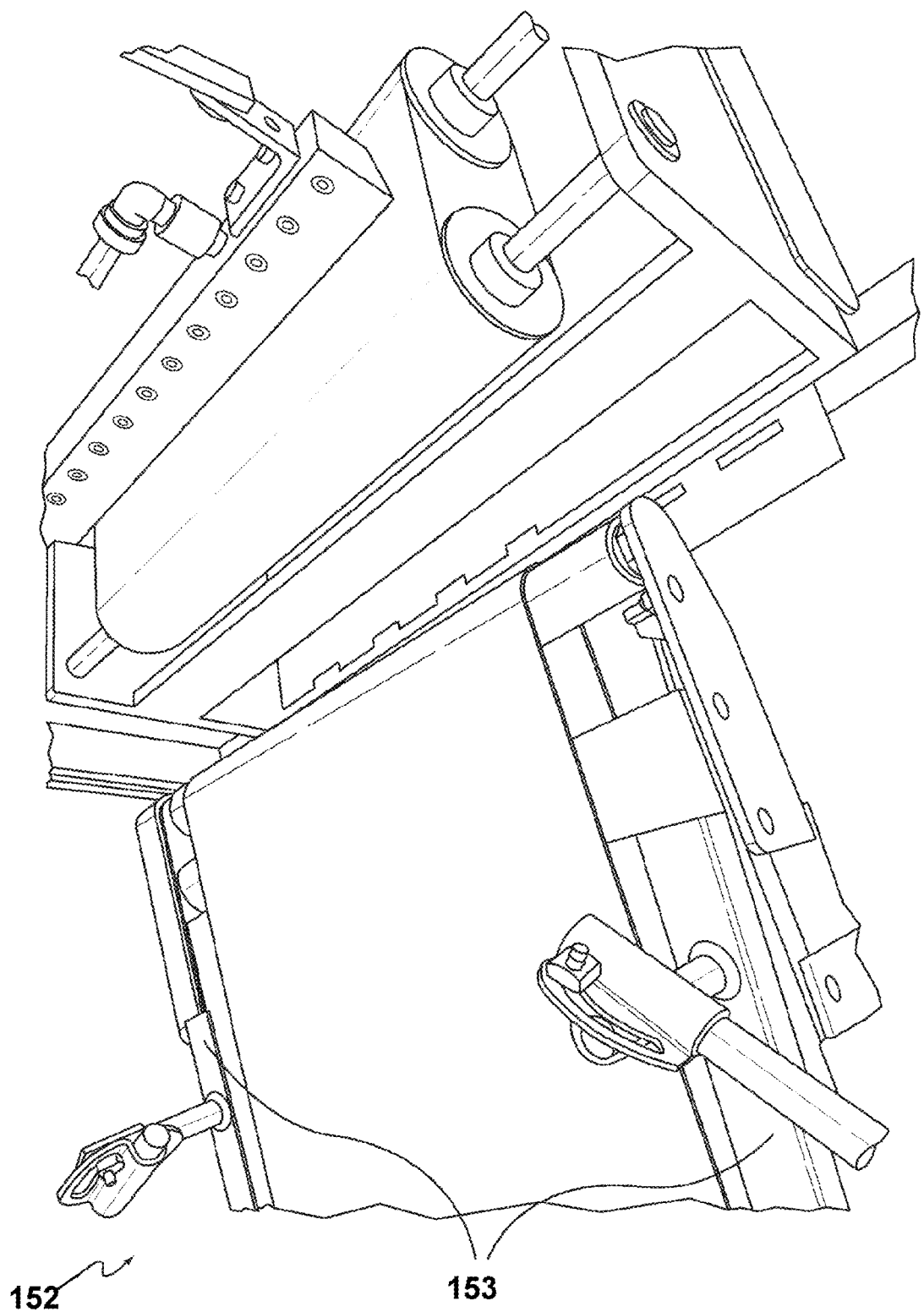
FIG. 15 is another view of the conveyor.
Figure 16:
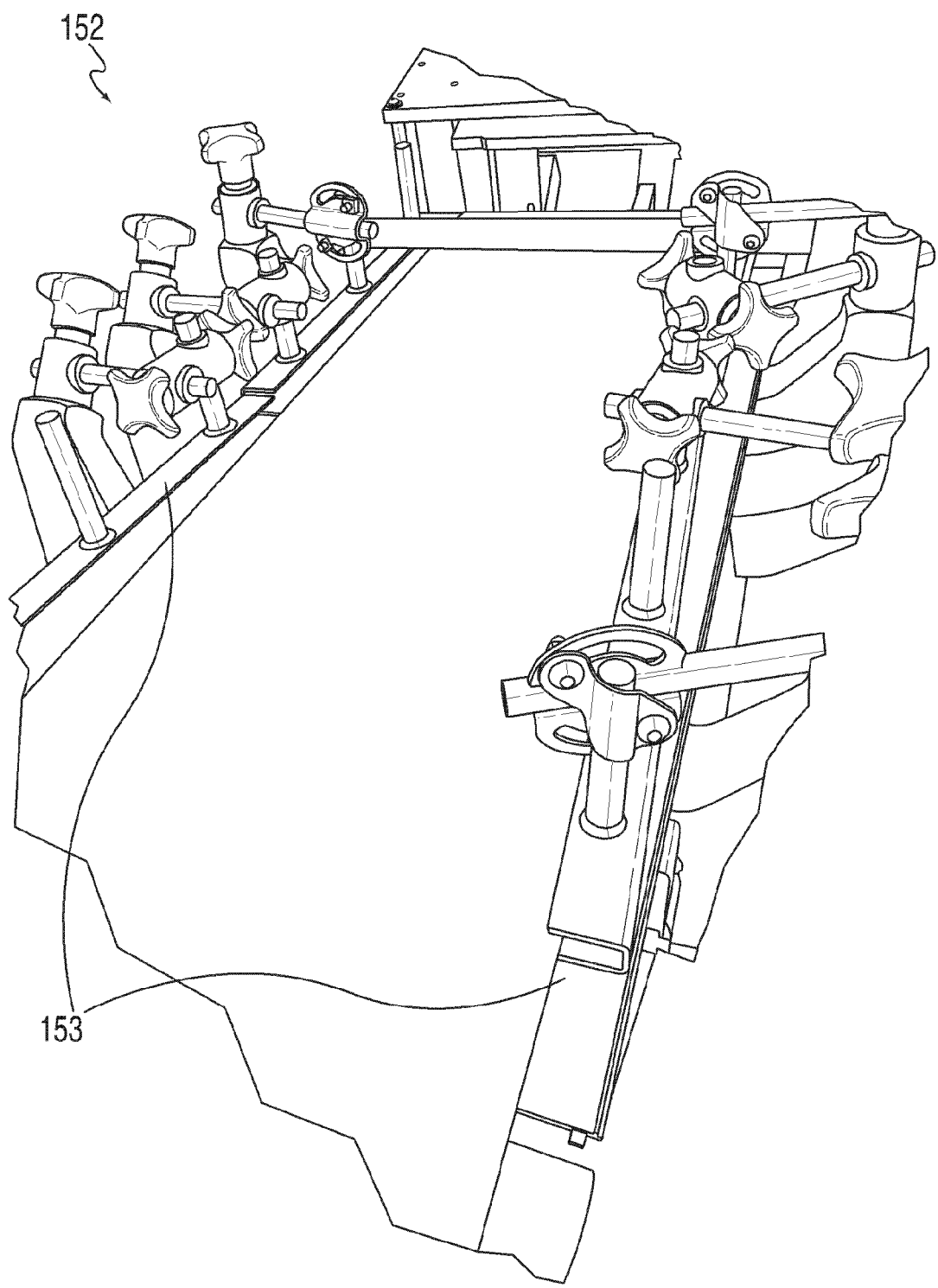
FIG. 16 is another view of the conveyor.
Figure 17:
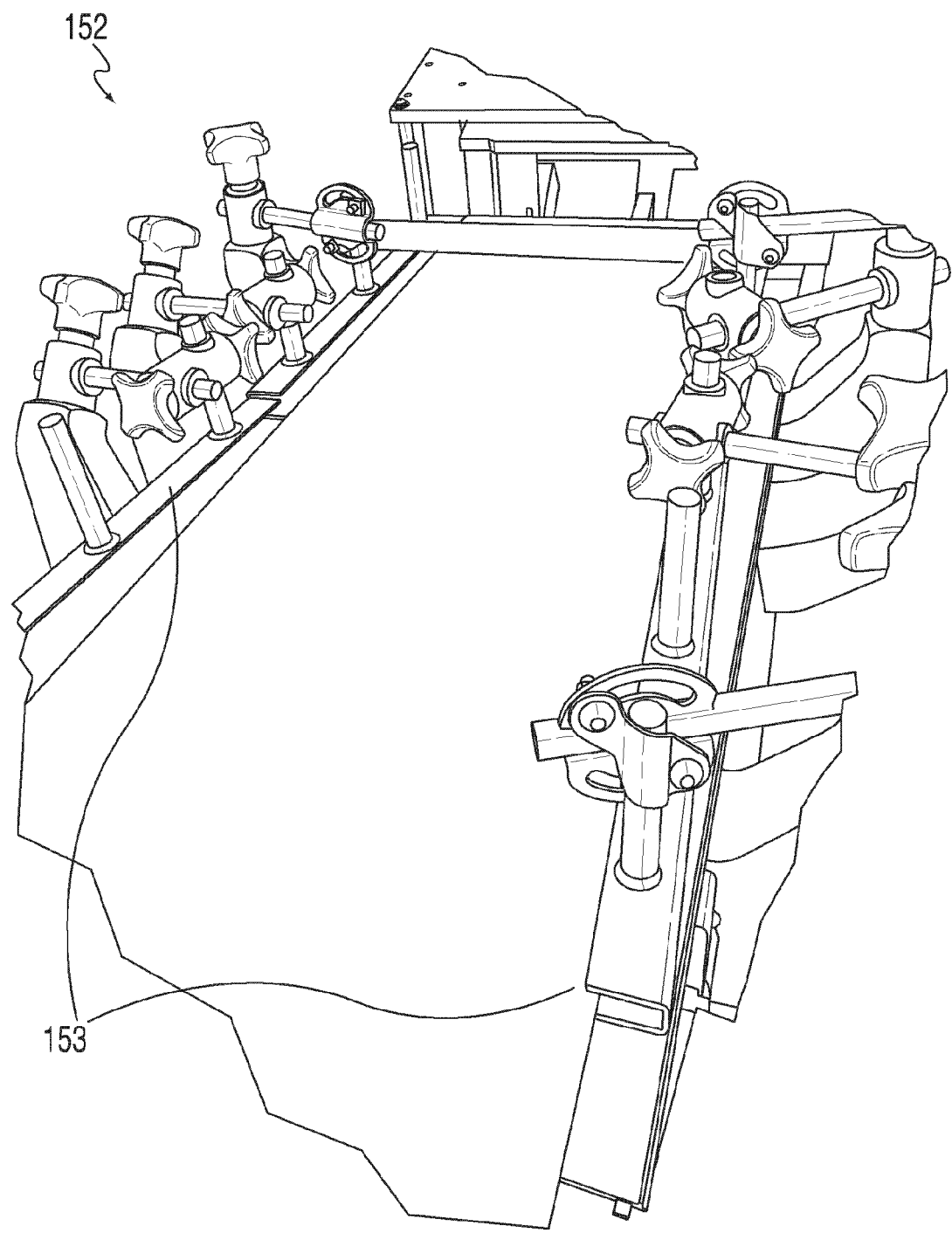
FIG. 17 is another view of the conveyor.

Another element of this system is that the plate 412, which holds the stack of material, can be mounted on rods or guide rails 420 (as shown in FIGS. 11-12) and slid backward out of the main body of the stacker mechanism so that the stack of material can be removed from the plate, or removed together with the plate, so that it can be placed in a jig that is then compressed and heated as part of the CBAM process.

Figure 4A:
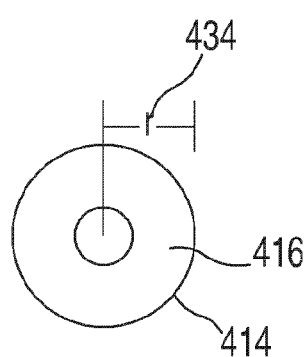
FIG. 4A illustrates a top view of a registration pin with a taper.
Figure 4B:
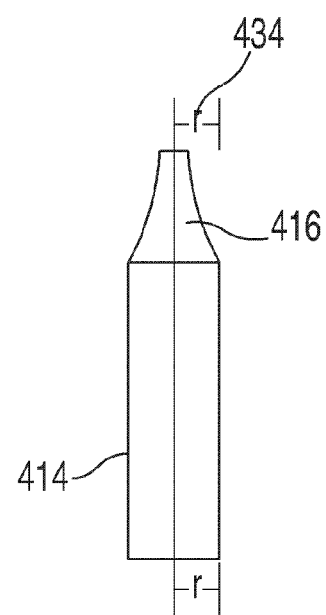
FIG. 4B illustrates a side view of a registration pin with a taper.
Figure 5:
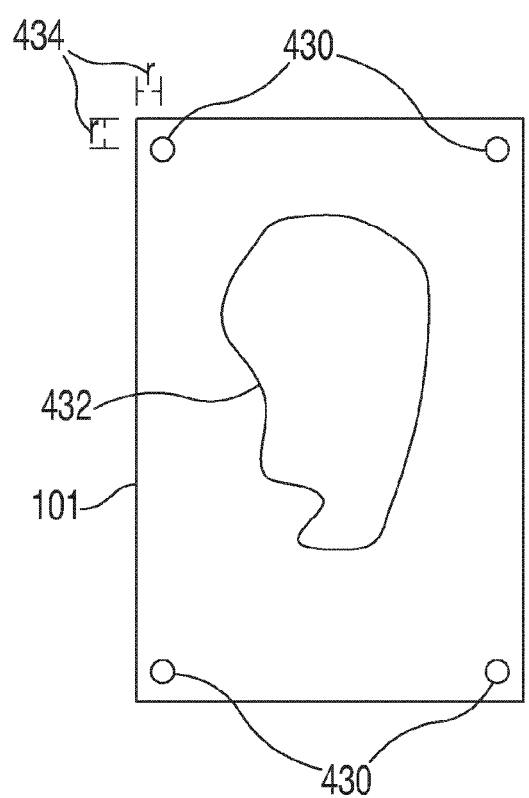
FIG. 5 illustrates a printed image on a substrate sheet in a position relative to punched registration holes.

FIG. 4A, FIG. 4B and FIG. 5 help to further illustrate the stacker 400. FIG. 4A illustrates a top view of a registration pin 414 with a taper 416. FIG. 4B illustrates a side view of a registration pin 414 with a taper 416. FIG. 5 illustrates an arbitrary printed layer image 432 on a substrate sheet 101 in a position relative to punched registration holes 430.

The diameter of the registration pin 414 below the taper 416 is of similar size to the diameter of the registration holes in the substrate sheets, and preferably just slightly smaller than the registration holes in the substrate sheets. The diameter of the registration pins along the taper area 416 decreases substantially. This allows the substrate sheet to be easily placed on the registration pins, because the ends of the pin tapers 416 are much smaller than the diameter of the registration holes. Then, when the substrate sheets travel down the pins 414 as they are stacked, they align tightly with the pins 414 thus ensuring appropriate registration between one sheet and another.

Figure 6:
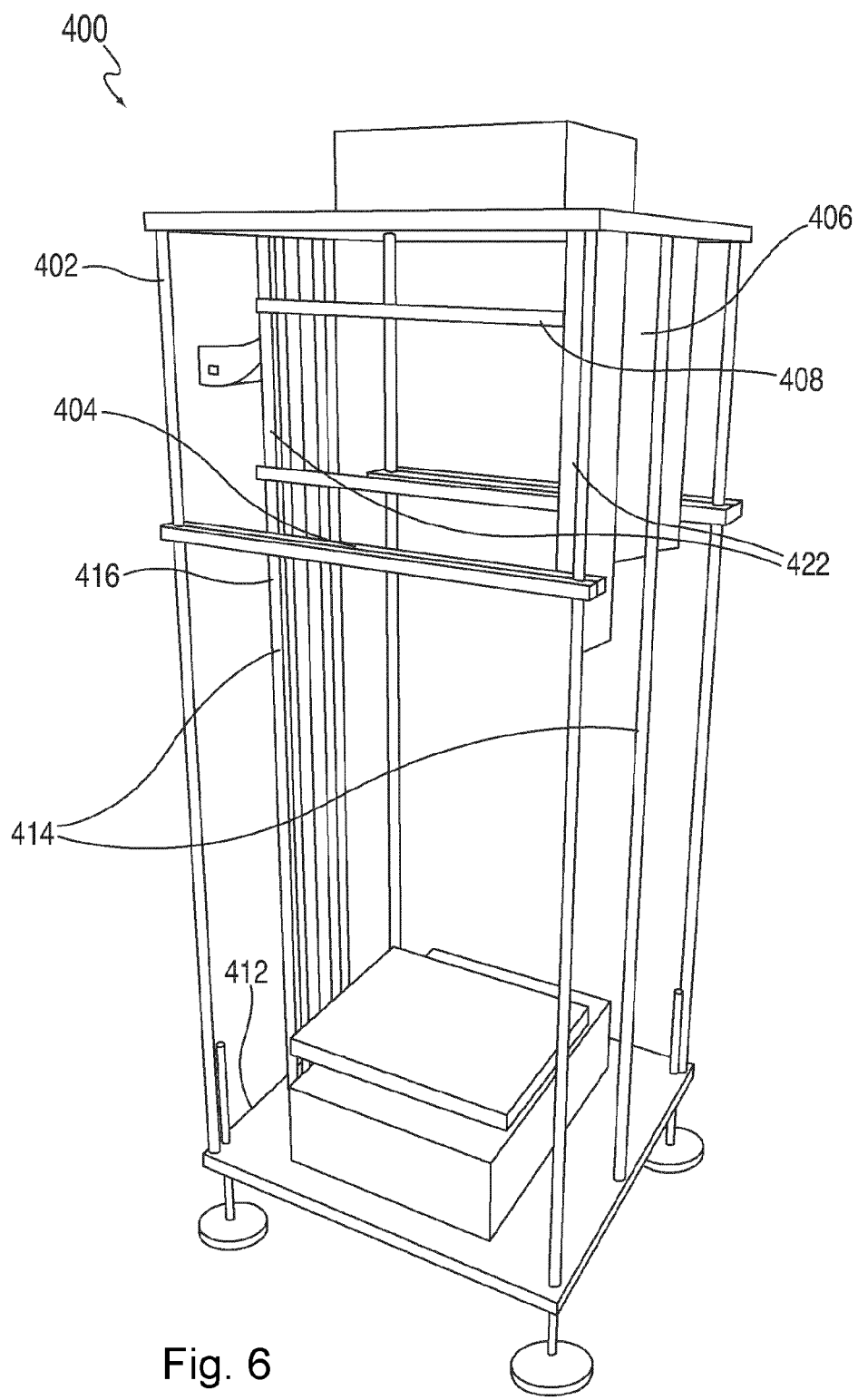
FIG. 6 shows another embodiment of a stacker.
Figure 7:
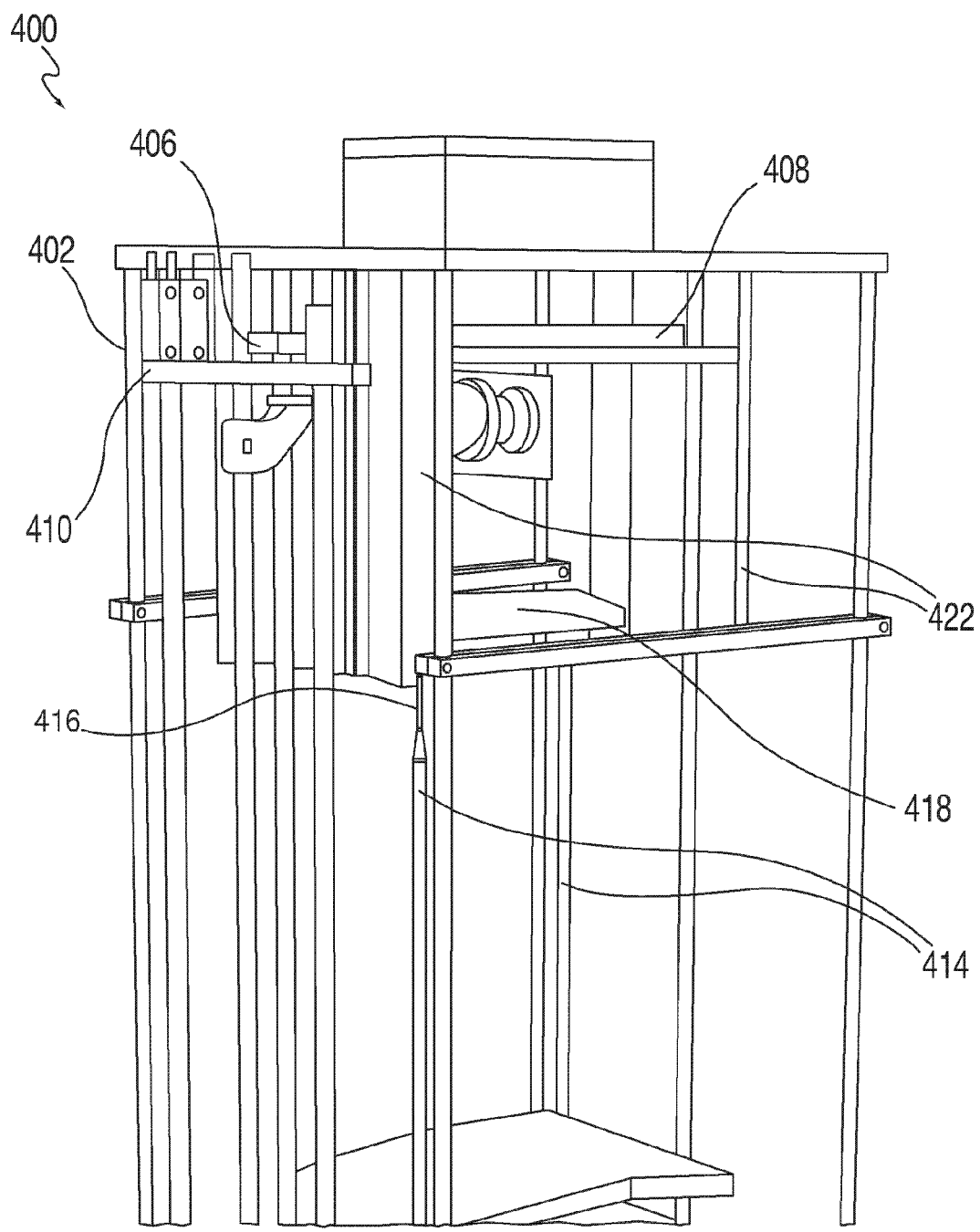
FIG. 7 is another view of an example stacker (excluding the bottom).
Figure 8:
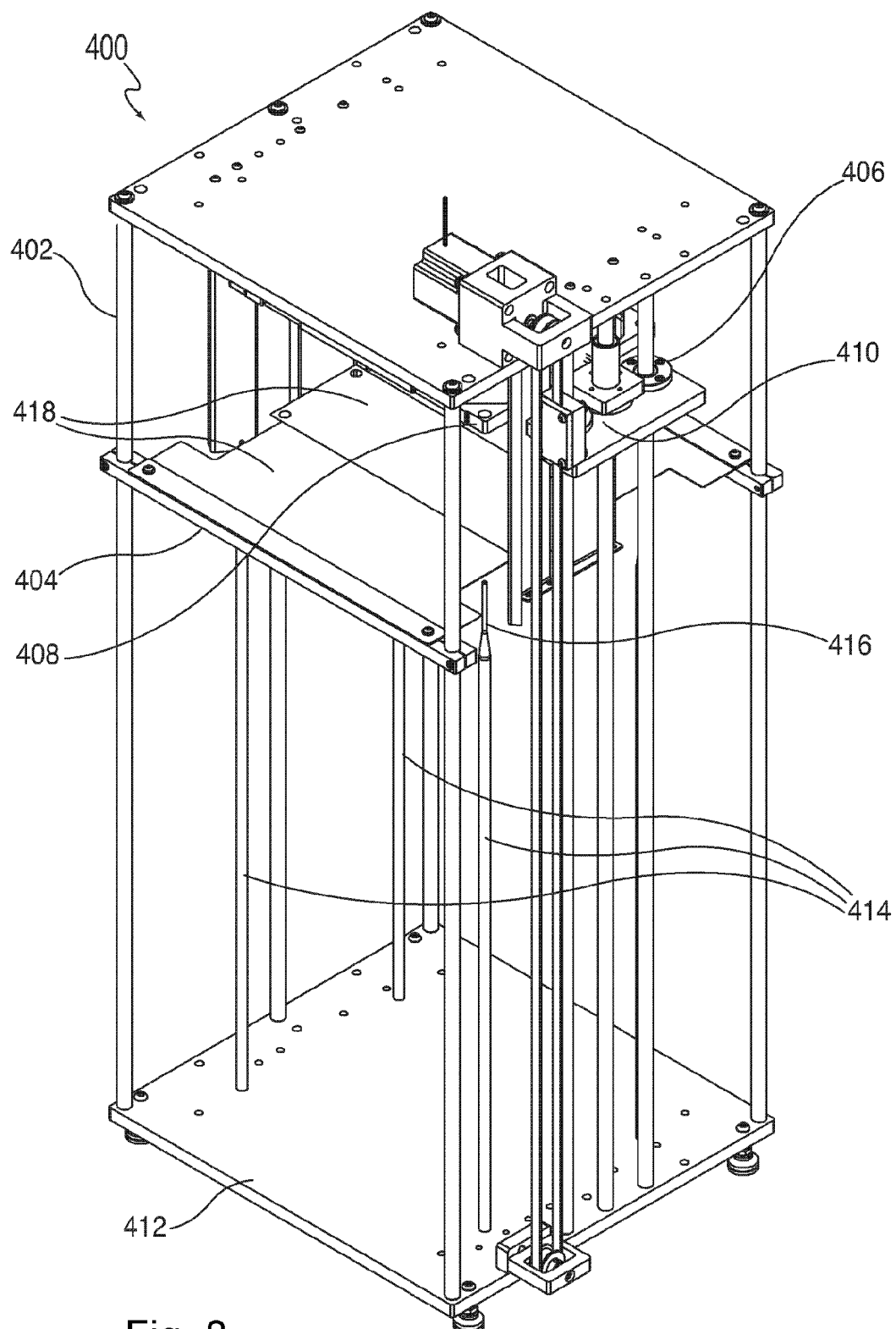
FIG. 8 is a schematic of a stacker.
Figure 9:
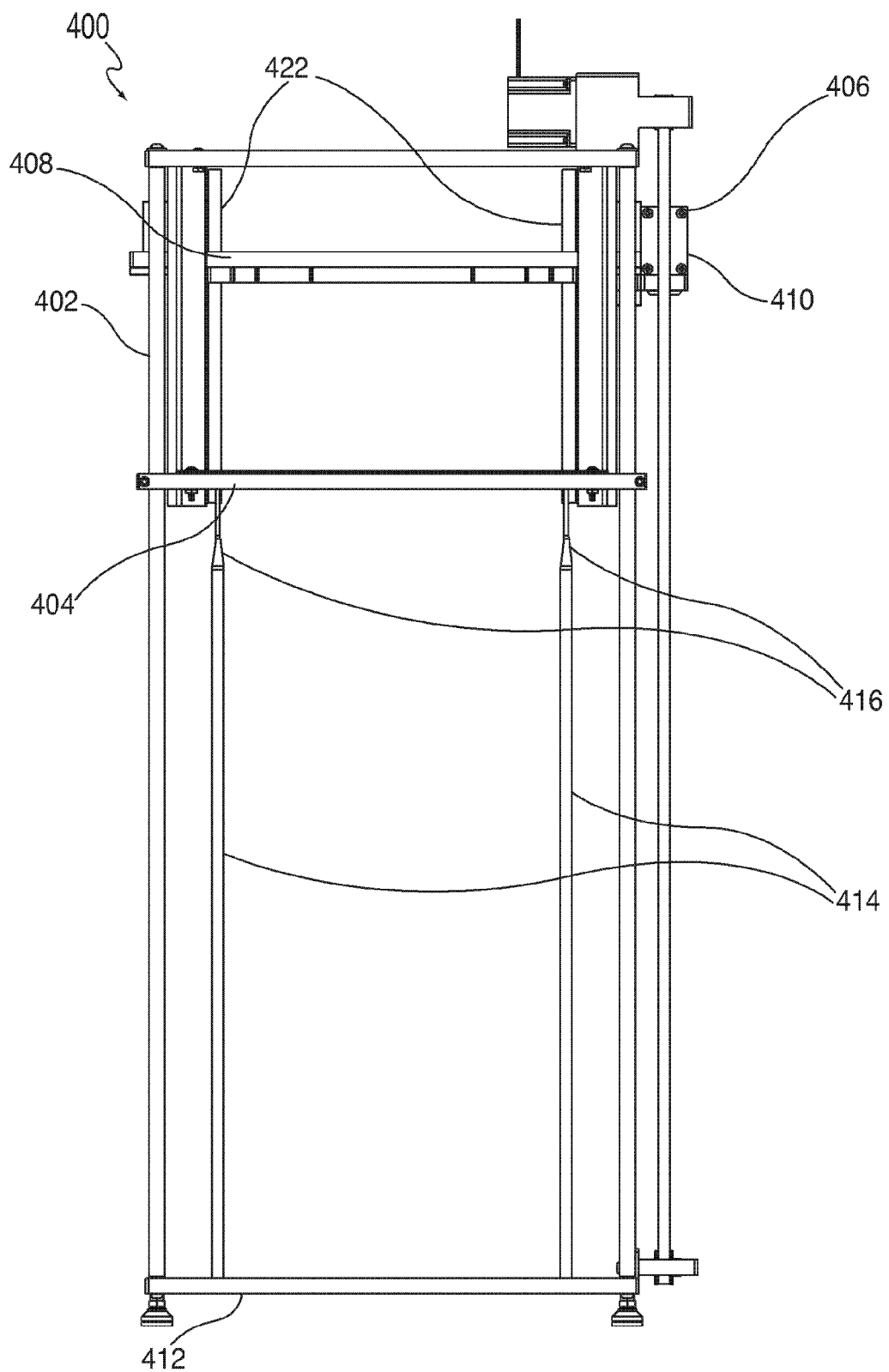
FIG. 9 is a schematic side view of the stacker.
Figure 10:
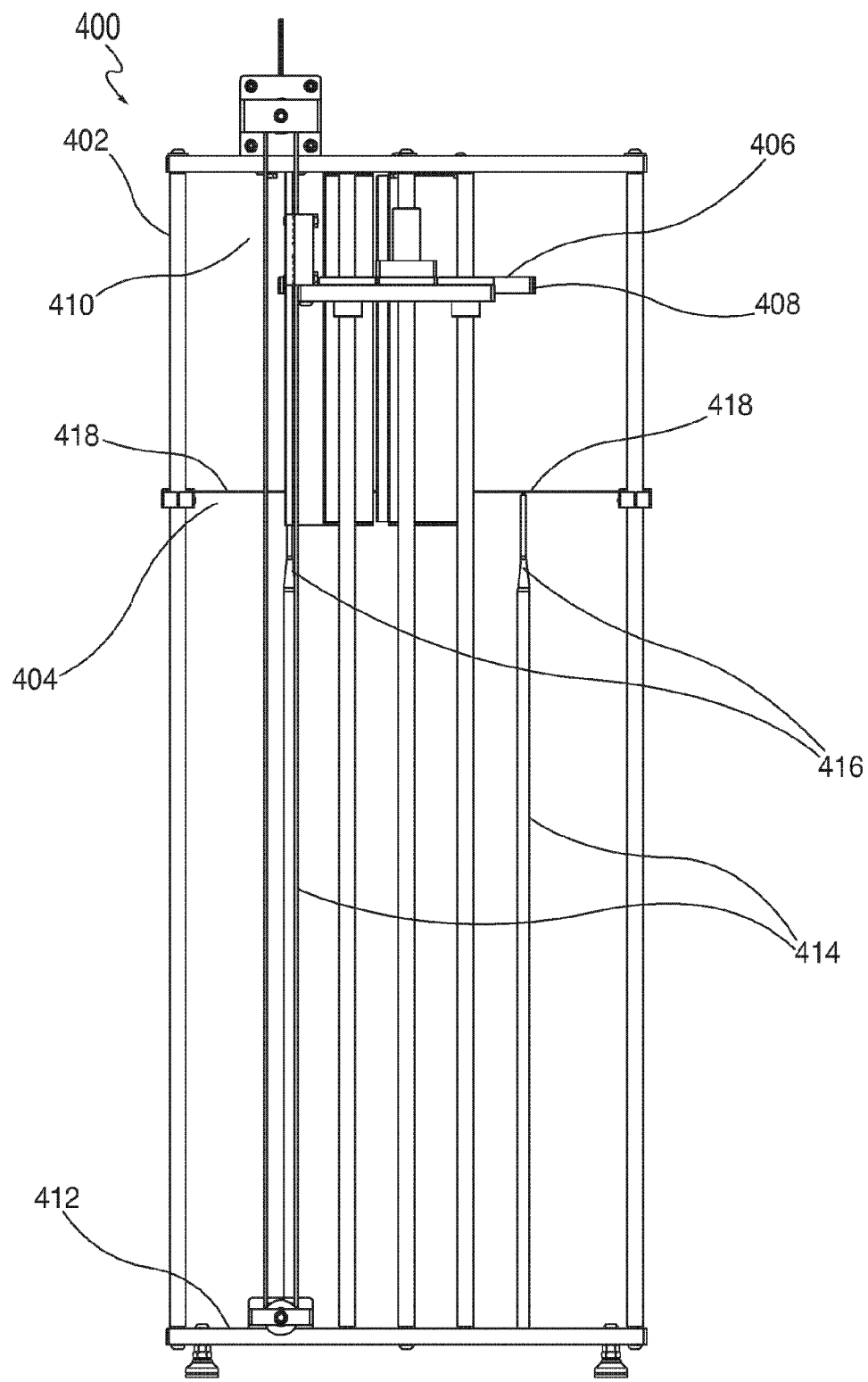
FIG. 10 is another schematic side view of the stacker.

More specifically, if the tapered pin 416/414 has a radius of r 434 (diameter is 2r), then when the sheet is initially placed into the stacker with its corners abutting stops 422 (see FIGS. 6 and 7), the punched holes 430 need only be anywhere within r 434 away from the location of tips 416 of the pins. Even with this imprecision, this allows the sheet 101 to be pushed onto the pins 414 and then achieve high precision in sheet-to-sheet registration.

The stacker 400 simplifies the design of the machine 100/190/195. Without the stacker 400, every sheet 100 would need to be at the exact same place at every stage of the process every time (e.g., material feeder 102, platen 400 placement). Every stage of the process has the possibility for error (and the error multiplies at every stage).

Stacker Subsystem

A different embodiment of the stacker 400 is shown in FIGS. 6-12. After the sheet 101 has had powder applied and excess powder removed (and, optionally, the remaining powder has been fused to the sheet), the sheets are stacked in order onto registration pins to align the sheets for later processing to form the 3D parts. The stacking is automatic using a stacker subsystem 400 such as shown in detail in FIGS. 6-12. The stacker comprises a frame 402, a sheet catcher 404, and a presser 406 comprising a press plate 408 and a belt driver system 410 that moves the press plate up and down. The frame further comprises a base plate 412. Registration pins 414 are mounted in the base plate 412 and project upwardly to a location just below the sheet catcher 404. The diameter of the registration pins are just slightly smaller than the size of holes that are punched in the substrate sheets, so that any lateral movement of the sheets is minimized once the sheets are stacked onto the registration pins. Further, the registration pins have tapers 416 at their top ends to facilitate placement of substrate sheets onto the pins. As shown in FIG. 11 and FIG. 12, the stacker also comprises a slide system to be able to load and unload the base plate 412, pins 414, and optionally stacked sheets 101. The slide system includes two rods or guide rails 420 enabling the base plate 412 to be loaded and unloaded. The stacker subsystem 400 also includes a mechanism to insert and remove pins 414 (the pins need to be aligned very accurately), as well as a computer 424 having a processor to control the sequence of movements of the stacker 400.

The sheet catcher 404 typically has two leaf springs 418, and a optional sensor (not shown) that can detect when a substrate sheet 101 is in the sheet catcher 404. The sensor can be any type of sensor, including an optical sensor, suitable for determining the presence or absence of an item. The conveyor 152 of the powder system 500 is disposed so that after a substrate sheet 101 exits the powder system 500, it is conveyed onto the sheet catcher 404 of the stacker system 400. The sheet catcher 404 includes stops 422 so that as the sheet 101 releases from the end of the conveyor into the sheet catcher 404, the stops 422 cause the sheet to stop its motion of travel and come to rest on top of the leaf springs 418. Then, the sensor, which detects the presence of the sheet, sends a signal causing the belt driver 410 to move the press plate 408 downward. As the press plate 408 moves downward, it depresses the leaf springs 418 thereby allowing the substrate sheet 101 to be pressed onto and downwardly along the registration pins 414. The press plate 408 continues downward until it reaches the base plate 412 or, if substrate sheets 101 have previously been stacked onto the base plate 412, the top of the stack of sheets 101. The press plate 408 then returns to its original position at the top of the stacker 400 and waits for the next substrate sheet 101 to enter the stacker 400 whereupon the process is repeated until the final substrate sheet 101 needed to make the 3D part is stacked. Processes downstream of the stacker 400 can be either manual (a worker carries the stack to the compression stage, then fusing stage, then abrasion stage) or automatic (not shown).

There is a tight fit between the top of the registration pins 414 (the tapers 416) and press plate 408, to minimize error. The pins 414 are inserted into collars of the base plate 412, which allow the pins 414 to be inserted into and taken out of the base plate 412 rapidly. The collars also make the registration pins 414 very straight vertically for proper alignment. Because the base plate 412 is on slides (rods or guide rails 420), the stack of sheets can be taken out with the base plate 412 and pins 414, and then another base plate 412 and pins 414 can be inserted into the frame 402 so that more parts can be made.

As the stack of sheets gets larger and larger, instead of having to keep track of how large the stack is and the location of the press plate 408, the belt 410 is connected to a presser 406 (which is the part that moves up and down), which can be off to the side of the stack and can run the full length of motion regardless of how many sheets 101 are on it. The press plate 408 rests on top of the presser 406, but the press plate 408 is not physically attached to the presser 406. As the presser 406 descends, the press plate 408 by gravity moves along with it. The press plate 408 then stops at the top of the stack and the presser 406 continues down to the bottom of the stacker 400. When the presser 406 returns upward again, it catches up with the press plate 408 and lifts the press plate 408 up again. The presser 406 runs along the full length of the stacker 400. Because the presser 406 is disconnected from the press plate 408, software does not need to keep track of how high the stack is.

Since the image is powdered, the images can be contaminated with powder from other images. Therefore, the press plate 406 is not just a flat plate; rather it has the shape of a cutout rectangle with cutouts where the pins 418 are located. The reason for the cutout rectangle is so that it can push on unprinted margins on the sheet 101 without touching the powder so no powder gets onto the press plate 408 or then transferred back onto another sheet 101.

The registration pins 414 typically fit in a collar so that they can be taken out with the resulting stack and transported. New pins can then put in, and the base plate slid back via the rods/guide rails 420. Making sure that the registration pins 414 are straight is very important, so there is a mechanism to keep the registration pins 414 straight. A very small error at the bottom of the pins translates to the tips 416 of the pins 414 being dislocated from their intended positions making it difficult to stack the sheets 101 onto the pins.

The leaf springs 418 (made of flexible spring steel) hold a single sheet in place before it is moved onto the pins 414. The leaf springs 418 allow the press plate 408 to travel through. As the press plate 408 presses a sheet 101 downwards, the press plate 408 deforms the leaf springs 418, thereby permitting both the plate and the sheet to pass through. After the plate passes through, the leaf springs contract back up (and the same action is repeated, but in the opposite direction, when the plate travels back up to the top of the stacker).

The stacker can accommodate variations in both sheet thickness and planar extent. In this embodiment there are several different sheet sizes. They are all typically of twelve inch width, but they can have different lengths (e.g., 4 inches, 8 inches, 12 inches, and 16 inches). By changing the spring steel hinge 418 (leaf springs), or the settings on the spring steel hinge 418, the stacker 400 can accommodate different sheet sizes, and in addition accommodate different locations in the various sheets sizes where the holes are punched and where the pins 418 are set within the stacker frame 402).

FIGS. 13-17 illustrate an example conveyor 152 with channels 153. Conveyors are used to move substrate sheets in the system. A conveyor can be used to move printed sheets from a platen where they are printed to a stacker represented by the present invention. The channels 153 align the sheet 101 if it is not rectilinear with respect to the conveyor 152.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A stacker apparatus for stacking and aligning substrate sheets, comprising:
   a frame having a base plate;
   a sheet catcher;
   a presser having a press plate and a system that moves the press plate up and down; and
   a plurality of registration pins that project upwardly to a location below the sheet catcher, the registration pins having tapers at their upper ends.

2. The apparatus of claim 1, wherein the diameter of the registration pins is larger than the size of holes that are punched in the substrate sheets, the holes being placed in positions relative to a position of layer images printed onto the sheets.

3. The apparatus of claim 1, further comprising a computer having a processor to control a sequence of movements of the stacking apparatus.

4. The apparatus of claim 1, wherein there is a tight fit between the tapers of the registration pins and the press plate, to minimize error.

5. The apparatus of claim 1, wherein the registration pins are inserted into the base plate.

6. The apparatus of claim 1, wherein there is no requirement to monitor the size of a stack of substrate sheets in the stacker.

7. The apparatus of claim 1, wherein the press plate is located in proximity to a stack of substrate sheets runs the full length of motion of the stacking apparatus regardless of how many substrate sheets are on the stacking apparatus.

8. The apparatus of claim 1, wherein the press plate rests on top of the presser, while not being attached to the presser.

9. The apparatus of claim 1, wherein the press plate is a cutout rectangle with cutouts for accommodating the registration pins.

10. The apparatus of claim 1, wherein the stacking apparatus can accommodate sheets of various thicknesses and planar extent by changing leaf springs or settings of the leaf springs, locations where holes are punched in the substrate sheets, and locations of where the registration pins are set within the frame.

* * * * *